Figure 1:
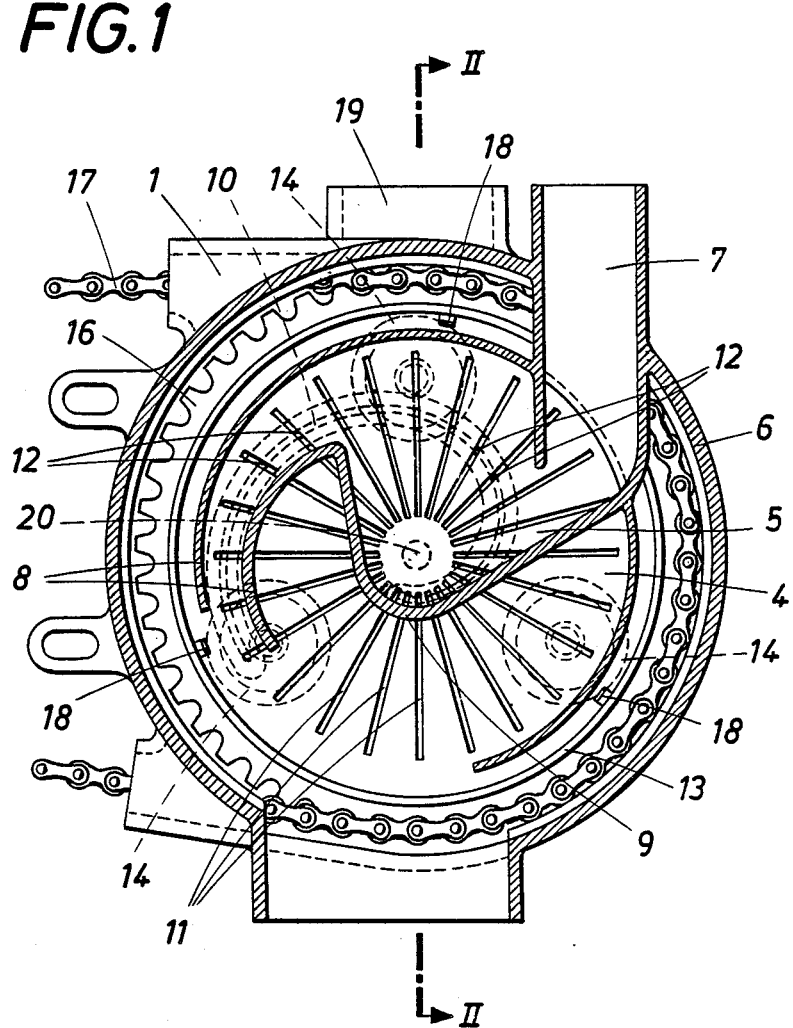

United States Patent [19]

Wintersteiger et al.

[11] Patent Number: 4,896,616

[45] Date of Patent: Jan. 30, 1990

[54] SEED PLANTER

[76] Inventors: Johann Wintersteiger, Gonetsreith 35, A-4910 Ried im Innkreis; Franz Spiesberger, Gunzing 51, A-4923 Lohnsburg, both of Austria

[21] Appl. No.: 363,636

[22] Filed: Jun. 8, 1989

Related U.S. Application Data

[63] Continuation of Ser. No. 129,866, Dec. 4, 1987, abandoned, which is a continuation of Ser. No. 442,144, Nov. 16, 1982, abandoned, which is a continuation of Ser. No. 236,684, Feb. 23, 1981, abandoned.

[30] Foreign Application Priority Data

Mar. 7, 1980 [AT] Austria ................................. 1266/80

[51] Int. Cl.⁴ ........................... A01C 7/04; A01C 7/20; B23Q 7/04; B65H 3/08
[52] U.S. Cl. ...................................... 111/185; 221/211
[58] Field of Search ............................. 111/77, 34, 85; 198/396, 397, 443; 221/211, 278

[56] References Cited

U.S. PATENT DOCUMENTS

| | | | |
|---|---|---|---|
| 425,364 | 4/1890 | Berrien | 111/52 |
| 1,331,235 | 2/1920 | Bristow | 221/211 |
| 2,383,523 | 8/1945 | Thornburgh | 221/211 X |
| 2,605,017 | 7/1952 | Bolen | 221/211 X |
| 2,986,305 | 5/1961 | Koerper et al. | 111/34 |
| 3,009,560 | 11/1961 | Frazier | 221/211 |
| 3,434,437 | 3/1969 | Mark et al. | 111/85 |
| 3,796,346 | 3/1974 | Ribovleau | 221/211 |

FOREIGN PATENT DOCUMENTS

| | | | |
|---|---|---|---|
| 2249521 | 6/1975 | France | 221/211 |
| 145399 | 5/1962 | U.S.S.R. | 111/34 |
| 531508 | 11/1976 | U.S.S.R. | 221/214 |

Primary Examiner—Danton D. DeMille
Attorney, Agent, or Firm—Kurt Kelman

[57] ABSTRACT

A device for sowing individual seed grains spaced from each other comprises a discharge disc which constitutes the rear wall of a seed box and has suction openings for sucking the seed grains and discharges the grains seed through a discharge passage of the box. To ensure that only a single grain will be discharged at a time, the discharge disc consists of two parts, namely, a disc body which communicates with the suction fan, and a disc blade which contacts the disc body on the side facing the supply of seeds in the seed box. One part is stationary and has a guide slot, which defines the discharge path. The other part is rotatably mounted and has peripherally spaced apart entraining slots, each of which extends throughout the radial extent of the guide slot.

6 Claims, 4 Drawing Sheets

SEED PLANTER

This application is a continuation of application Ser. No. 129,866, filed Dec. 4, 1987, now abandoned, which is a continuation of Ser. No. 442,144, filed Nov. 16, 1982, now abandoned, which was a continuation of Ser. No. 236,684, filed Feb. 23, 1981, now abandoned.

This invention relates to a device for sowing individual seed grains spaced from each other comprising a dicharge disc which constitutes the rear wall of a seed box and communicates with a suction fan through openings for sucking grains of seed from the interior of the seed box. This disc is adapted to be driven so as to carry the sucked grains of seed along a discharge path extending from a point near the bottom of the seed box upwardly and above the supply of seeds and through a dischrge passage in the seed box out of the latter.

In known seed-sowing device of this kind, the suction openings of the discharge disc are disposed on a concentric circle so that the sucked grains of seed are necessarily discharged out of the seed box along a circular path. As a result, the suction openings will always move at the same velocity although for a reliable sucking, of the grains of seeds it, would be desirable to move the suction openings more slowly as they take up the grains of seed, particularly when the seed box has already been emptied to a high degree. Particularly in breeding, the rotating discharge disc must discharge a grain of seed at each suction opening in order to ensure that an empty place in a row of plants is due to a non-germinating grain of seed rather than to a failure to plant a grain of seed. Besides, all grains of seed, also undersize ones, must be planted in breeding and this requirement cannot reliably be fulfilled where the known discharge discs are used because the cross-section of their suction openings cannot be varied so that suction openings which are too large in cross-section relative to the grain of seed may suck more than one grain of seed. To prevent the dischrge disc from carrying along two or more grains of seed at one suction opening, scrapers are provided, which extend into the path along which the grains of seed are to be discharged, These scrapers serve to scrape off any excessive grain of seed so that it will fall back into the seed box and only a single grain will be discharged at each suctionopening. But said scapers cannot perform their function unless the grains of seed are identical in size and shape; this cannot always be expected in the case of seeds for breeding. As a result, the scapers may scrape off all grains which have been sucked or the discharge disc may carry more than one grain past the scrapers at a suction opening. Whereas suction openings large in cross-section will promote a reliable sucking of the grains of seed, they are not favorable as regards the desired dischrge of single grains. In the design of the known seed-spacing drills, a compromise has been adopted but does not ensure a discharge of single grains with the reliability that is required particularly for breeding.

These disadvantages are encountered also in a known seed-sowing device (Austrian Patent Specification 318,961), in which the suction openings of the discharge disc are disposed in two concentric circles, the grains of seed are sucked to and held at the outer suction openings and are then pushed by means of a scraper against the suction openings of the inner circle when they are no longer covered. Any surplus grain of seed should fall away from the suction opening during that transfer so that the operation again depends on the shape and size of the individual grains of seed.

It is an object of the invention to avoid these disadvantages and so to improve a seed-sowing device of the kind described first hereinbefore that a perfect discharge of all grans of seed containd in the seed box will be ensured even if the grains of seed differ widely in shape and size.

This object is accomplished in accordance with the invention with a discharge disc consisting of two parts, namely, a disc body which communicates with the suction fa, and a disc blade which contacts the disc body on its side facing the seeds, one of said parts being stationary and being formed with a guide slot, which defines the discharge path, and the other part being rotatably mounted and formed with peripherally spaced apart entraining slots, each of which extends throughout the radial extent of the guide slot.

Because in accordance with the invention, the discharge disc is composed of a stationary part and a rotatable part, which covers the stationary part, and the stationary part is provided with a guide slot and the rotatable part is provided with entraining slots, the suction openings are provided in the regions where the entraining slots overlap the guide slot so that the discharge path for the seeds is defined by the stationary guide slot, which can be designed as desired because it is stationary. For this reason the discharge path need no longer extend along a circle which is concentric to the axis of rotation of the rotatably mounted part of the discharge disc and the velocity of the suction openings can be varied as they move to discharge the grains of seed. As a result, the discharge movement may be slower in the supply of seeds and it can thus be ensured that at least one grain of seed will actually be sucked to each suction opening regardless of the level to which the seed box is filled. Another important result produced by the use of a discharge disc composed of a stationary part and a moving part resides in that the grains of seed sucked to the discharge disc will contact both parts of the discharge disc because the part which faces the seed box consists of a thin disc blade and each grain of seed will be sucked also against the disc body through the slot of the disc blade. The sucked grains of seed will be rotated as they contact both parts of the discharge disc so that any surplus grain of seed will be thrown of. As the sucked grains of seed are rotated due to friction, a single grain of seed will penetrate the suction opening to a larger depth or will cover the same to a larger extent whereas any other grain of seed which has been sucked, too, will be displaced from the suction opening and fall back into the seed box.

This singling of the grains of seed can be assisted if the radial distance of the guide slot from the axis of rotation of that part of the discharge disc which is formed with the entraining slots increases at least from one region to another as the distance from the bottom of the box increases. As the radial spacing from the axis of rotation of that part of the discharge disc which is formed with the entraining slots increases, the velocity at which the sucked grains of seed are moved by the entraining slots increases, too, and this will promote the throwing off of those grains which are not firmly sucked; in this connection, centrifugal forces are particularly significant.

Because the suction openings are provided in the regions where the entraining slots and the guide slots overlap, the shape of the slots can be selected so that the cross-sectional area of the suction openings will vary along the discharge path. For instance, the guide slot may be widened near the bottom of the box because this willpromote the reliable sucking of the grains of seed. If the guide sot tapers along the discharge path, the area in which the entraining slots and the guide slot overlap will decrease in the course of the discharge movement so that the suction openings will also decrease during that movement and each suction opening will more reliably discharge only a single grain.

Whereas it is sufficient for each entraining slot to extend throughout the radial extent of the guide slot so that the suction openings will move throughout the length of the guide slot, the entraining slots may have such a configuration that they accelerate the grains of seed, although this is not required in general. Particularly desirable structural conditions will be obtained if the entraining slots consist of radial slots.

Either the wheel blade or the wheel body may constitute the stationary part of the discharge disc because it is merely essential that the seeds can protrude through the disc blade to contact also the disc body. Particularly simple conditions regarding the seal between the suction conduit and the disc body will be obtained, however, if the disc blade is adapted to be driven and is formed with the entraining slots whereas the disc body is stationary because in that case there will be no need for special seals between moving parts. No difficulties are involved in the seal between the disc blade and the disc body because the disc blade is sucked to the disc of the disc blade particularly at the guide slot. In addition, the disc body may be formed with holes for sucking the disc blade, which is so thin that it acts like a diaphragm when sucked.

The disc blade can be mounted in a simple manner because it is sucked to the disc body. Only suitable drive means are required. For this purpose the disc body may be desirably surrounded by a drum, which is adapted to be driven and provided with coupling elements for driving the disc blade. The drum leaves the disc body freely accessible for the connection to the suction fan. This free access must be ensured, of course, by a suitable mounting of the drum. If the drum is mounted for this puspose on three rollers, which are disposed within the drum and peripherally spaced apart, the shell of the drum can be engaged by a chain or belt for driving the drum.

Figure 2:
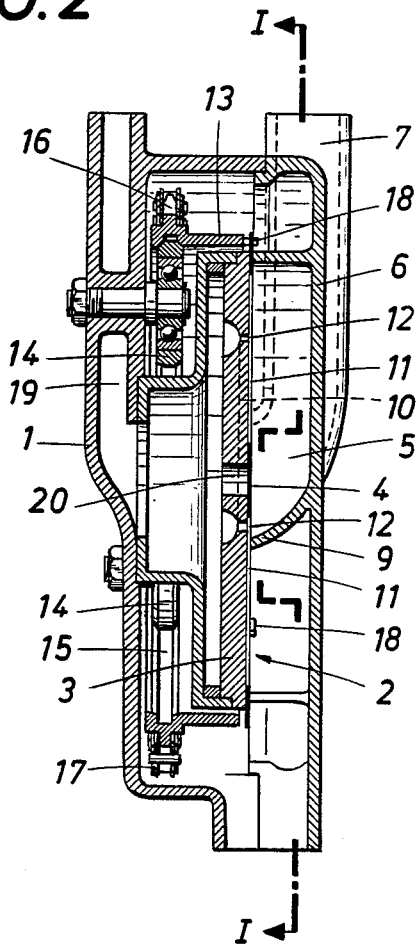
Figure 3:
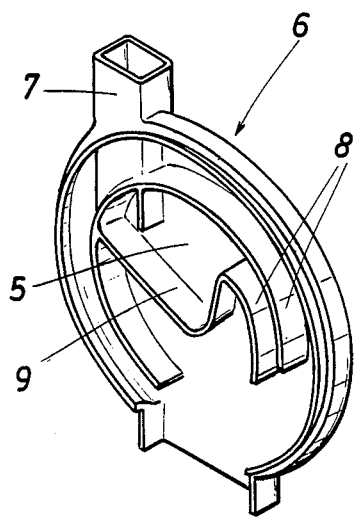
Figure 4:
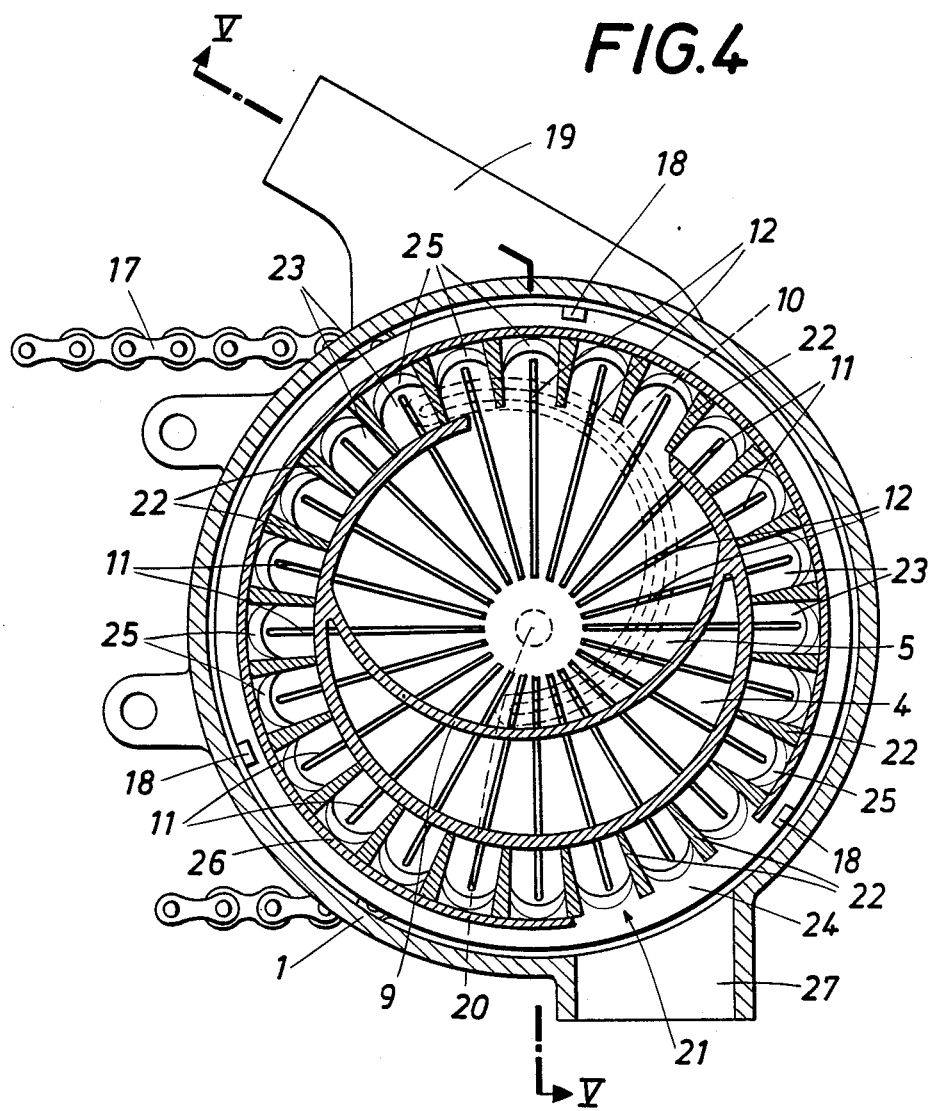
Figure 5:
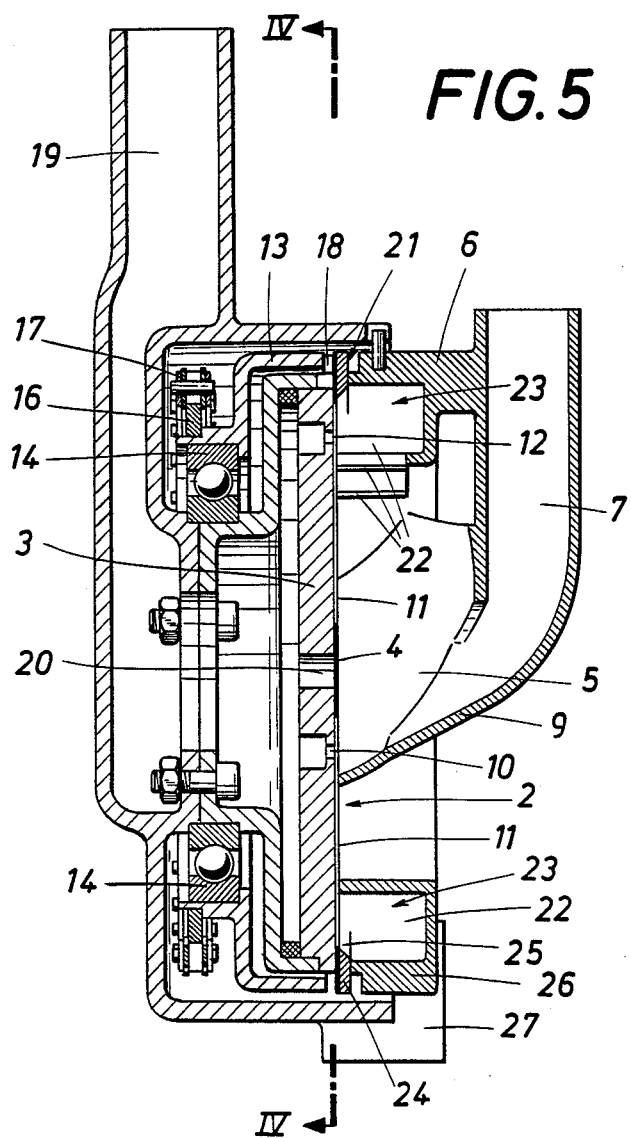

Embodiments of the invention are shown by way of example on the accompanying drawings, in which FIG. 1 is a sectional view taken on line I—I of FIG. 2 and showing a seed-sowing device embodying the invention, FIG. 2 is a sectional view taken on line II—II in FIG. 1, FIG. 3 is a perspective view showing the cover of the seed box as viewed from the inside, FIG. 4 shows a modified seed-sowing device embodying the invention in a sectional view taken on line IV—IV in FIG. 5, and FIG. 5 is an axial sectional view taken on line V—V in FIG. 4.

The seed-sowing device shown in FIGS. 1 to 3 substantially comprises a housing 1, which contains a discharge disc 2. The discharge disc 2 consists of a disc body 3, which is non-rotatably connected to the housing 1, and a disc blade 4, which contacts the disc body and constitutes a rear wall of a seed box 5. The seed box 5 constitutes a part of the cover 6 for the housing, as is clearly apparent from FIG. 3. The seeds to be planted enter the seed box 5 through a feed pipe 7 and are discharged from the seed box 5 by the discharge disc 2 through a passage defined by two guide walls 8.

The stationary disc body 3 is formed with a spiral slot 10, which extends from the bottom 9 of the seed box and defines the discharge path for each grain of seed. The disc blade 4 has radial entraining slots 11, which extend throughout the radial extent of the guide slot 10. Suction openings 12 for sucking the grains of seed are formed where the guide slot 10 and the entraining slots 11 overlap. For a discharge of the grains of seed, the suction openings 12 must be suitably moved; this is effected by rotating the disc blade 4. For this purpose the disc body 3 is surrounded by a drum 13 supported by three rollers 14, which are rotatably mounted in the housing 1 and engage a raceway 15 on the inside surface of the drum 13 so that the outside peripheral surface of the drum 13 remains free and can be provided with a chain sprocket 16, which is in mesh with a chain 17 for driving the drum 13. The drive is transmitted from the drum 13 to the disc blade 4 by axially protruding coupling elements 18, which enter corresponding openings in the disc blade 4. The disc blade 4 is sucked to the disc body 3 at the guide slot 10 which communicates with a suction fan through a suitable duct 19, and the housing cover 6 is provided with suitable webs, which prevent the disc blade 4 from falling from the coupling elements 18, which serve also to center the disc blade 4. For this reason, the disc blade 4 can be mounted in a particularly simple manner, which affords the advantage that, when the housing cover 6 has been removed, the disc blade 4 can be removed without need for a release of additional connecting means and can then be replaced by another disc blade, if required. To reliably ensure a snug contact of the disc blade 4 with the disc body 5, the latter may be formed with an additional opening 20 for sucking the disc blade 4 to the disc body.

The guide slot 10 is widened near the bottom 9 of the seed box so that there are larger suction openings 12 in that region and the sucking of at least one grain of seed is ensured. As the disc blade 4 is driven, the grains of seed which have been sucked are discharged by the entraining slots 11 moving the grains of seed out of the seed box 5 along the discharge path defined by the guide slot 10. Because the grains of seed penetrate through the disc blade 4, the grains of seed contact not only the disc blade 4 at the entraining slots 11 but also the stationary disc body 3 at the guide slot 10. As a result of this double penetration into the entraining slots and the guide slot, the sucked grains of seed will be rotated in the suction openings 12 by friction so that one grain will be sucked deeper into a given suction opening 12 or will cover the same to a larger extent whereas any grain of seed which has been sucked to the same suction opening will be pushed away from the latter and fall back into the seed box. The singling of the grains of seed which have been sucked to a suction opening is promoted by the fact that the guide slot 10 tapers as the distance from the bottom 9 of the seed box increases; this has the result that the suction openings 12 decrease in size as the discharge movement proceeds. The singling is also promoted by the fact that the distance of discharge openings 12 to the axis of rotation of the disc blade 4 increases and this will result in a generation of accelerating and centrifugal forces, which tend to separate from the suction openings any grains of seed which are not firmly sucked against the suction openings.

To ensure a uniform planting of the single grains of seed discharged at the suction openings 12 from the seed box 5, a star wheel 21 shown in FIGS. 4 and 5 is provided for handling the grains of seeds which have been discharged and comprises partitions 22, which define cells 23 and are integrally formed with a ring 24, which is formed with oblique apertures 25 adjacent to the radial entraining slots 11. Because the ring 24 of the star wheel 21 and the disc blade 4 are fitted on the axially protruding coupling elements 18 of the drum 13, the star wheel 21 will move in unison with the disc blade 4. As the grains of seed which have been sucked are dischrged, the suction openings move radially outwardly along the entraining slots 11 in accordance with the configuration of the stationary guide slot 10 and, because the entraining slots 11 extend between the partitions 22 which define the cells 23, the grains of seed are caused to enter the open cells. Because star wheel 21 is guided in housing 26, which surrounds the seed box 5 and which closes the cells 23 at least between the discharge opening of the seed box 5 and an outlet 27 formed by a chute, the grains of seed which have entered respective cells are positively conveyed by the star wheel to the outlet 27 so that all grains of seed, regardless of their size and shape, will move to the outlet 27 at a uniform velocity and along the same path. As a result, the grains of seeds will be planted with a uniform spacing. To ensure that the grains of seed enter respective cells 23 and can be dropped through the outlet, the housing 26 for guiding the star wheel 21 is formed with suitable through openings in its inner and outer peripheral walls. Because the openings 25 are oblique, the grains of seed cannot be caught by the ring 24 of the star wheel 21 at the outlet 27 so that this oblique arrangement ensures that the grains of seed will not be obstructed as they are thrown off.

A particularly simple structure will be obtained if the housing 26 for guiding the star wheel 21 is integral with the seed box 5 and constitutes part of the cover 6. In that case, when it is desired to exchange the disc blade 4, it is sufficient to remove the cover 6 so that the star wheel 21 and the disc blade 4 can be pulled from the coupling pins 18 of the drum 13 without need for a tool. When the cover 6 has been mounted, an end face of the ring 24 of the star wheel 21, which is guided by the housing 26, engages the disc blade 4 to prevent an unintended separation of the disc blade 4 from the disc body 3 when the suction fan communicating with the discharge disc has been de-energized.

What is claimed is:

1. A device for separating individual seed grains from a multiplicity of seed grains exclusively by suction and sowing the individual seed grains spaced from each other, comprising
    (a) a seed box adapted to contain the multiplicity of seed grains, the seed box having an interior defined by
        (1) a bottom extending from an inlet for feeding a supply of seed grains into the seed box interior to a discharge passage for discharging the individual seed grains, and
        (2) a rear wall constituted by a discharge disc consisting of a first part and a second part, the first part being a disc body having a planar contact surface and the second part being a planar disc blade in contact with the disc body contact surface, one of the parts being stationary and the other part being mounted for rotation about an axis extending perpendicularly to the planar disc body contact surface, the stationary disc part defining a seed guide slot extending from a point near the bottom of the seed box upwardly and eccentrically about the axis over a sector thereof and through the discharge passage, and the rotatably mounted part defining peripherally spaced entraining slots intersecting the guide slot, spaced suction openings being formed at substantially radial intersections between the guide and entraining slots, and the widths of the guide and entraining slots being smaller than a maximal diameter of the seed grains so as to permit penetration of only a single one of the seed grains through the disc blade to contact both the guide and entraining slots,
    (b) suction means communicating through the suction openings with the interior of the seed box whereby a respective one of the single seed grains is sucked therefrom into the suction openings, and
    (c) drive means for rotating the rotatably mounted disc part, the combination of the rotating disc part and the contact of the seed grain by the guide and entraining slots causing each single seed grain sucked into the respective suction opening to be rotated radially outward by friction and to be sucked deeper into the respective suction opening than adjacent seed grains, causing adjacent seed grains to fall back into the seed box, and the entraining slots in the rotating disc part carrying the individual spaced seed grains held by suction in the spaced suction openings in a discharge path through the discharge passage.

2. The seed-sowing device set forth in claim 1, wherein said entraining slots consist of substantially radial slots.

3. The seed-sowing device set forth in claim 1, wherein
    said drive means comprise a drum, which surrounds said disc body and carries coupling elements which engage said disc blade and
    said drum is rotatable to rotate said disc blade by means of said coupling elements.

4. The seed-sowing device set forth in claim 3, wherein said drum is rotatably mounted on three peripherally spaced apart rollers disposed within said drum.

5. The seed-sowing device set forth in claim 1, wherein the discharge path extends spirally.

6. The seed sowing device set forth in claim 1, wherein the guide slot tapers from a wider lower portion to a narrower upper portion.

* * * * *